United States Patent
Iwai et al.

(10) Patent No.: US 9,820,319 B2
(45) Date of Patent: Nov. 14, 2017

(54) MOBILE COMMUNICATION SYSTEM, MOBILE COMMUNICATION APPARATUS, NETWORK ASSIST INFORMATION TRANSMISSION METHOD, AND NON-TRANSITORY COMPUTER READABLE MEDIUM

(71) Applicant: NEC Corporation, Tokyo (JP)

(72) Inventors: Takanori Iwai, Tokyo (JP); Masayoshi Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/892,831

(22) PCT Filed: Apr. 16, 2014

(86) PCT No.: PCT/JP2014/002148
§ 371 (c)(1),
(2) Date: Nov. 20, 2015

(87) PCT Pub. No.: WO2014/188655
PCT Pub. Date: Nov. 27, 2014

(65) Prior Publication Data
US 2016/0219635 A1    Jul. 28, 2016

(30) Foreign Application Priority Data
May 23, 2013    (JP) .................................. 2013-109018

(51) Int. Cl.
*H04W 24/02*    (2009.01)
*H04B 7/14*    (2006.01)
(Continued)

(52) U.S. Cl.
CPC ......... *H04W 76/023* (2013.01); *H04W 24/02* (2013.01); *H04W 76/021* (2013.01); *H04W 88/04* (2013.01)

(58) Field of Classification Search
CPC . H04W 76/023; H04W 24/02; H04W 76/021; H04W 88/04; H04B 7/14;
(Continued)

(56) References Cited

U.S. PATENT DOCUMENTS 9,036,603 B2 *    5/2015    Johnsson .............. H04W 24/04
                                              370/329
2003/0132877 A1 *    7/2003    Forrester .............. H04B 1/3805
                                              342/357.76
(Continued)

FOREIGN PATENT DOCUMENTS

EP         2166796 A1 *    3/2010    ............ H04W 36/08
EP         2 958 384 A1    12/2015
(Continued)

OTHER PUBLICATIONS

3GPP TS 22.368 V11.3.0, 3rd Generation Partnership Project; Technical Specification Group Services and System Aspects; Service requirements for Machine-Type Communications (MTC); Stage 1, Release 11, pp. 1-24, Sep. 2011.
(Continued)

*Primary Examiner* — Andrew Wendell
(74) *Attorney, Agent, or Firm* — Finnegan, Henderson, Farabow, Garrett & Dunner, L.L.P.

(57) ABSTRACT

An object of the invention is to provide a mobile communication system capable of changing network parameters based on connection information about connection devices connected to a mobile communication apparatus. A mobile communication system according to the present invention includes: a mobile communication apparatus (10) connected to connection devices (21) to (23); and a network operator device (30) disposed in a mobile communication network (40) managed by a mobile communication carrier. The mobile communication apparatus (10) detects connection information about the connection devices (21) to (23) and
(Continued)

the network operator device (30) changes a network parameter or a network process associated with the mobile communication apparatus (10) based on network assist information determined according to the connection information about the connection devices (21) to (23) that is detected by the mobile communication apparatus (10).

26 Claims, 12 Drawing Sheets

(51) Int. Cl.
*H04B 7/185* (2006.01)
*H04W 76/02* (2009.01)
*H04W 88/04* (2009.01)

(58) Field of Classification Search
CPC ............ H04B 7/15507; H04B 7/15592; H04B 7/18526; H04B 7/18539; H04B 7/18558
See application file for complete search history.

(56) References Cited

U.S. PATENT DOCUMENTS

| | | | |
|---|---|---|---|
| 2010/0201569 A1* | 8/2010 | Lee | G01S 5/0036 342/357.42 |
| 2011/0078317 A1* | 3/2011 | Nelson | H04L 12/5692 709/227 |
| 2011/0212686 A1 | 9/2011 | Lee et al. | |
| 2012/0281621 A1* | 11/2012 | Lotfallah | H04L 12/145 370/328 |
| 2013/0130686 A1* | 5/2013 | Ikeda | H04W 48/16 455/435.1 |
| 2015/0256961 A1* | 9/2015 | Kim | H04W 74/085 370/329 |
| 2015/0373528 A1* | 12/2015 | Iwai | H04W 24/02 455/419 |

FOREIGN PATENT DOCUMENTS

| | | |
|---|---|---|
| JP | 2012-507238 | 3/2012 |
| WO | WO 2013/069170 A1 | 5/2013 |

OTHER PUBLICATIONS

International Search Report dated Jul. 15, 2014 in corresponding PCT International Application.
Extended European Search Report issued by the European Patent Office in counterpart European Patent Application No. 14801008.5, dated Nov. 25, 2016.

\* cited by examiner

MOBILE COMMUNICATION SYSTEM, MOBILE COMMUNICATION APPARATUS, NETWORK ASSIST INFORMATION TRANSMISSION METHOD, AND NON-TRANSITORY COMPUTER READABLE MEDIUM

CROSS-REFERENCE TO RELATED PATENT APPLICATIONS

This application is a National Stage Entry of International Application No. PCT/JP2014/002148, filed Apr. 16, 2014, which claims priority from Japanese Patent Application No. 2013-109018, filed May 23, 2013. The entire contents of the above-referenced applications are expressly incorporated herein by reference.

TECHNICAL FIELD

The present invention relates to a mobile communication system which controls network parameters using network assist information determined according to connection information about connection devices to be connected to a mobile communication apparatus.

BACKGROUND ART

In recent years, there has been a demand for a method to optimize settings for processing nodes which constitute a mobile communication system. The 3GPP (3rd Generation Partnership Project) has proposed a method to optimize a network process depending on utilization characteristics of a mobile communication terminal (Non Patent Literature 1). For example, a network process for a terminal fixedly located in a specific place may be executed in such a manner that the load of a control process related to the movement of the terminal can be reduced. Specifically, the interval at which the terminal executes location registration may be set to be longer than a predetermined period of time. When the mobile communication terminal is a terminal that allows a delay, the network process may be executed in such a manner that data is transmitted to the mobile communication terminal, while the communication time is controlled to avoid a time when the amount of transmitted and received data is at a peak.

In recent years, the configurations of mobile communication systems have changed into various forms. For example, there is a configuration in which a mobile communication network communicates with a mobile router that aggregates a plurality of terminals. Thus, there is also a demand for optimizing the network process for a mobile router which is different from a cellular phone or the like that transmits information directly input from a user to a mobile communication network.

CITATION LIST

Patent Literature

Non Patent Literature 1: 3GPP TS 22.368 V11.3.0 (2011-09) 3rd Generation Partnership Project; Technical Specification Group Services and System Aspects; Service requirements for Machine-Type Communications (MTC); Stage 1 (Release 11)

SUMMARY OF INVENTION

Technical Problem

However, as described above, the optimization of the network process is executed using predetermined information in each mobile terminal. For example, whether the terminal is a terminal which is fixedly located in a specific place, or a terminal which allows a delay, is determined using predetermined service information, terminal information, or the like of the terminal. At present, in addition to the optimization of the network process, it is also required to execute the optimization of the network process for the mobile terminal whose utilization characteristics vary. Accordingly, there is a demand for executing the optimization of the network process using information other than service information or the like which does not vary frequently in general.

It is an object of the present invention to provide a mobile communication system, a mobile communication apparatus, a network assist information transmission method, and a program which can solve the above-mentioned problems.

Solution to Problem

A first exemplary aspect of the present invention is a mobile communication system including: a mobile communication apparatus connected to a plurality of connection devices; and a network operator device disposed in a mobile communication network managed by a mobile communication carrier. The mobile communication apparatus detects connection information about the connection devices. The network operator device changes a network parameter or a network process associated with the mobile communication apparatus based on network assist information determined according to the connection information about the connection devices, the connection information being detected by the mobile communication apparatus.

A second exemplary aspect of the present invention is a mobile communication apparatus including: a connection information extraction unit that detects connection information about a plurality of connection devices connected to the mobile communication apparatus; and a network assist information generation unit that generates network assist information used to change a network parameter or a network process associated with the mobile communication apparatus according to the connection information, and transmits the generated network assist information to a network operator device disposed in a mobile communication network managed by a mobile communication carrier.

A third exemplary aspect of the present invention is a network assist information transmission method including: detecting connection information about a plurality of connection devices connected to an apparatus; generating network assist information used to change a network parameter or a network process associated with the apparatus according to the connection information; and transmitting the generated network assist information to a network operator device disposed in a mobile communication network managed by a mobile communication carrier.

A fourth exemplary aspect of the present invention is a program for causing a computer to execute the steps of: detecting connection information about a plurality of connection devices connected to an apparatus; generating network assist information used to change a network parameter or a network process associated with the apparatus according to the connection information; and transmitting the generated network assist information to a network operator device disposed in a mobile communication network managed by a mobile communication carrier.

Advantageous Effects of Invention

According to the present invention, it is possible to provide a mobile communication system, a mobile communication apparatus, a network assist information transmission method, and a program which are capable of changing network parameters based on connection information about connection devices connected to the mobile communication apparatus.

DESCRIPTION OF EMBODIMENTS

First Exemplary Embodiment

Figure 1:
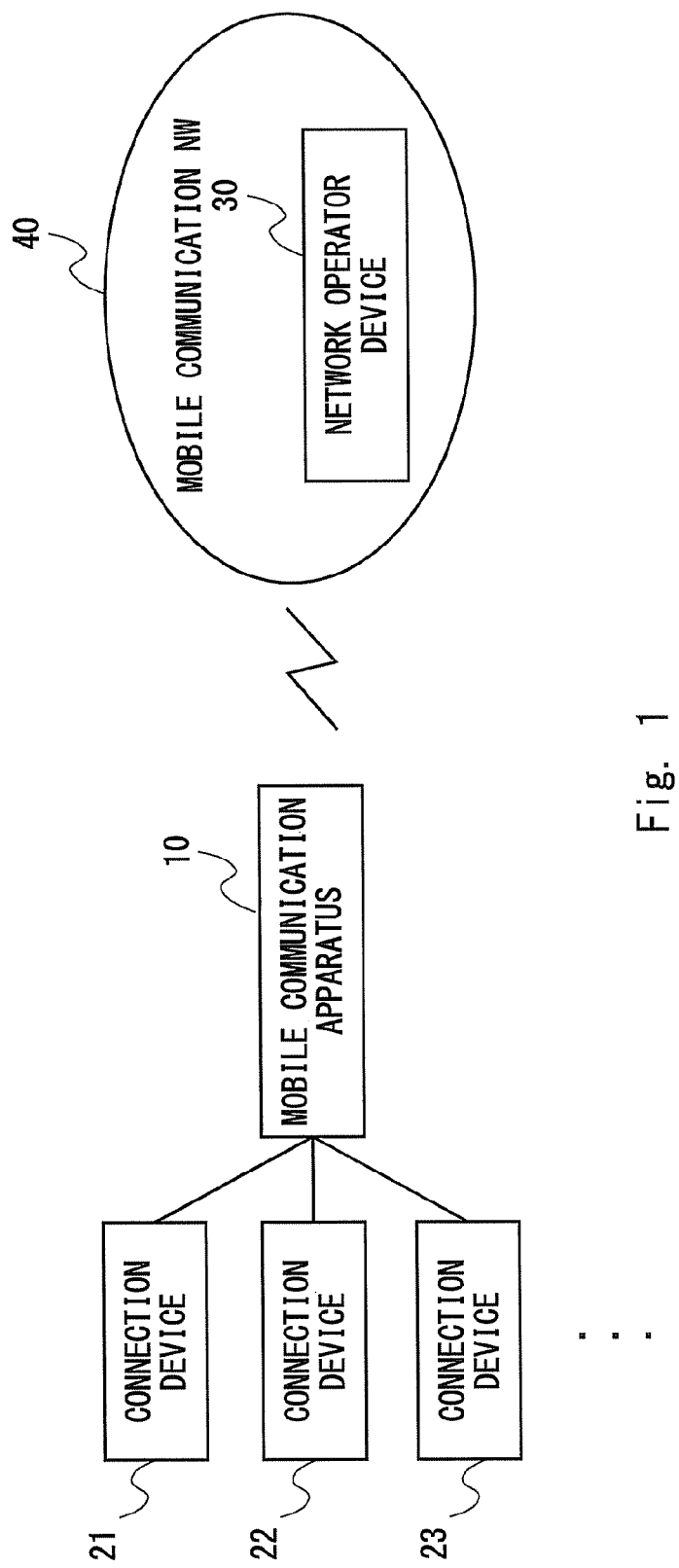
FIG. 1 is a block diagram showing a mobile communication system according to a first exemplary embodiment.

Exemplary embodiments of the present invention will be described below with reference to the drawings. A configuration example of a mobile communication system according to a first exemplary embodiment will be described with reference to FIG. 1. The mobile communication system shown in FIG. 1 includes a mobile communication apparatus 10, connection devices 21 to 23, and a network operator device 30. The network operator device 30 is disposed in a mobile communication network 40 which is managed by a mobile communication carrier.

The connection devices 21 to 23 may be, for example, various sensors, such as temperature sensors, or GPS devices. Alternatively, the connection devices 21 to 23 may be M2M devices. The M2M device is, for example, a device that autonomously transmits data between communication devices without involving any user operation. The connection devices 21 to 23 may also be car navigations, game terminals, smart meters, or the like.

The mobile communication apparatus 10 is connected to the connection devices 21 to 23. In this case, the number of connection devices to be connected to the mobile communication apparatus 10 is not limited to three. The number of connection devices may be less or more than three. The mobile communication apparatus 10 aggregates the connection devices 21 to 23 and connects to the mobile communication network 40 via a wireless line. For example, the mobile communication apparatus 10 communicates with a radio base station, which constitutes the mobile communication network 40, via a wireless line.

Further, the mobile communication apparatus 10 may communicate with the connection devices 21 to 23 by near field communication, or by being physically and directly connected to the connection devices 21 to 23 via a cable or the like. The near field communication may be Bluetooth®, infrared-ray communication, or the like. As another alternative, Near Field Communication (NFC) which is defined as a wireless communication standard may also be used as the near field communication. The mobile communication apparatus 10 may communicate with the connection devices 21 to 23 by a wireless LAN.

The mobile communication apparatus 10 may be a mobile router disposed between the mobile communication network 40 and the connection devices 21 to 23. The mobile communication apparatus 10 may also be a cellular phone terminal, a smartphone terminal, a notebook personal computer, or the like each having a mobile router function.

The mobile communication apparatus 10 detects connection information between the connection devices 21 to 23 which are connected to the mobile communication apparatus 10 and the mobile communication apparatus 10. For example, the connection information is information including at least one of: information about the number of the connection devices connected to the mobile communication apparatus 10; information about the type of the connection devices connected to the mobile communication apparatus 10; information about the number of the connection devices in an active state; information about the quality of communication between the mobile communication apparatus 10 and the connection devices; and information about the state of the connection devices.

The state in which the mobile communication apparatus 10 is connected to the connection devices 21 to 23 is, for example, a state in which an authentication process between the mobile communication apparatus 10 and each of the connection devices is completed and it is ready to transmit or receive data. The information about the type of the connection devices is, for example, identification information indicating the type of terminals such as a temperature sensor, a GPS, a speaker, a car navigation system, a game, and a pedometer. The information about the type of the connection devices may be indicated using, for example, a MAC address, a production number, or a serial number of each of the connection devices. Information such as manufacturer information or the period of sales may be added to the information about the type of the connection devices.

The connection device in the active state is, for example, a connection device which is in a state of being connected to the mobile communication apparatus 10 and is actually performing data communication with the mobile communication apparatus 10. In other words, the connection device in a non-active state is a connection device which is in a state of being connected to the mobile communication apparatus 10 and is not performing data communication with the mobile communication apparatus 10. Examples of the active state may include a state in which a game terminal is performing a game via a mobile router 12; a state in which an information appliance is connected to a server via the mobile router 12 and updates firmware; and a state in which a smart meter serving as a connection device is transmitting electric power information via the mobile router 12.

The non-active state may be, for example, a state in which the connection device is not communicating with the mobile communication apparatus 10, that is, a so-called sleep state. The sleep state is a state in which the connection devices 21 to 23 reduce the number of their functions to operate so as to suppress power consumption, or a state in which some of the functions of the connection devices 21 to 23 are suspended.

The information about the quality of communication between the mobile communication apparatus 10 and the connection devices 21 to 23 is, for example, information indicating the quality of a wireless line between the mobile communication apparatus 10 and the connection devices 21 to 23, or the degree of congestion of the wireless line. For example, when it is difficult to get through to the wireless line due to the effect of interference of radio waves different from the radio wave used for communication between the mobile communication apparatus 10 and the connection devices 21 to 23, the mobile communication apparatus 10 may detect, as connection information, information indicating that, for example, the quality of the wireless line has deteriorated, or the degree of congestion of the wireless line has increased.

As the information about the quality of communication between the mobile communication apparatus 10 and the connection devices 21 to 23, for example, a use bandwidth value or a use bandwidth ratio (hereinafter referred to as a use bandwidth value or the like) between the mobile communication apparatus 10 and the connection devices 21 to 23 may be extracted. For example, the mobile communication apparatus 10 may extract the use bandwidth value or the like for each connection device, or may extract the total use bandwidth values of the connection devices 21 to 23.

The information about the state of the connection devices may be, for example, information about a remaining battery level of each of the connection devices 21 to 23.

The network operator device 30 changes a network parameter or a network process associated with the mobile communication apparatus 10 based on network assist information determined according to the connection information detected by the mobile communication apparatus 10.

The network assist information is information used to adjust or optimize network parameters managed by the network operator device 30. The network parameters are associated with the mobile communication apparatus 10. The network parameters are information and policy for each node device within the network to determine the process of the mobile communication apparatus 10. The information and policy for determining the process of the mobile communication apparatus 10 may be, for example, information about communication resources and a telephone number or QoS policy. Each node device may be, for example, a base station or a core network device in the mobile communication network. Next, the network assist information will be described in detail.

The network assist information may be, for example, information about a communication interval at which the mobile communication apparatus 10 performs communication, or information about a bandwidth required by the mobile communication 10. The network assist information may be, for example, information indicating that the communication interval set in the mobile communication apparatus 10 is reduced or increased, or information indicating that the communication band allocated to the mobile communication apparatus 10 is enlarged or narrowed.

Alternatively, the network assist information may be, for example, information about the movement state of the mobile communication apparatus 10. Since the mobile communication apparatus 10 is expected to move, the network assist information may be, for example, information indicating that a location registration area is enlarged. Otherwise, since the mobile communication apparatus 10 is expected to stop for a predetermined period of time, the network assist information may be, for example, information indicating that the location registration area is narrowed.

The network assist information may include information indicating a network process. The network process may be, for example, a process of changing a network parameter.

The network parameter may be, for example, a value for determining resource information necessary for the mobile communication apparatus 10 to perform wireless communication. For example, the network parameter may be information about the value of the communication band allocated to the mobile communication apparatus 10, the communication interval set in the mobile communication apparatus 10, or the location registration area of the mobile communication apparatus 10. The network parameter may also be a timing at which the mobile communication apparatus 10 is disconnected from the mobile communication network 40.

As described above, the use of the mobile communication system shown in FIG. 1 enables the network operator device 30 to change the network parameter or the like related to the mobile communication apparatus 10 by using the network assist information determined according to the connection information detected by the mobile communication apparatus 10. Specifically, the network operator device 30 can change the network parameter or the like related to the mobile communication apparatus 10 based on the information that dynamically changes in the mobile communication apparatus 10. Accordingly, the network operator device 30 disposed in the mobile communication network 40 can maintain the settings of network parameters in the optimum state every time the connection information changes in the mobile communication apparatus 10. This configuration makes it possible to effectively use the communication resources in the mobile communication network 40.

Second Exemplary Embodiment

Figure 2:
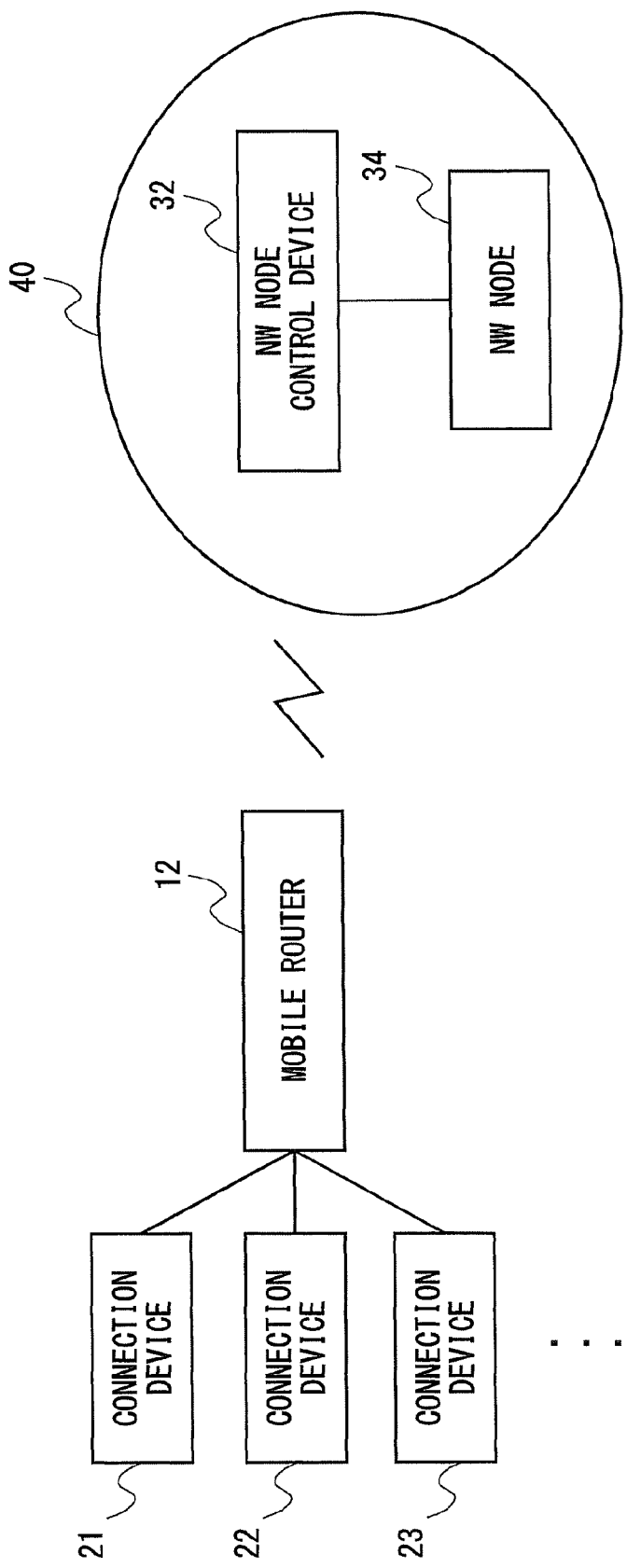
FIG. 2 is a block diagram showing a mobile communication system according to a second exemplary embodiment.

Next, a configuration example of a mobile communication system according to a second exemplary embodiment of the present invention will be described with reference to FIG. 2. The mobile communication system shown in FIG. 2 includes the mobile router 12, the connection devices 21 to 23, a network (NW) node control device 32, and an NW node 34. The NW node control device 32 and the NW node 34 are disposed in the mobile communication network 40. The devices shown in FIG. 2 that are similar to those shown in FIG. 1 are denoted by the same reference numerals. The detailed descriptions of the devices shown in FIG. 2 that are similar to those shown in FIG. 1 are omitted.

The NW node control device 32 and the NW node 34 constitute the mobile communication network 40. The mobile communication network 40 may be a network for 2G/3G/LTE, for example, which are specified in the 3GPP, or may be a PHS network, a Wimax network, a wireless LAN, or the like.

The mobile router 12 corresponds to the mobile communication apparatus 10 shown in FIG. 1. The NW node control device 32 and the NW node 34 correspond to the network operator device 30 shown in FIG. 1. The mobile router 12 relays communication between the mobile communication network 40 and the connection devices 21 to 23. Specifically, the mobile router 12 transmits data transmitted from the connection devices 21 to 23 to the mobile communication network 40, and transmits data transmitted from the mobile communication network 40 to the connection devices 21 to 23.

In this case, the mobile router 12 generates network assist information according to the detected connection information. The mobile router 12 transmits the generated network assist information to the NW node control device 32.

In this case, the mobile router 12 may transmit the network assist information to the NW node control device 32 at a time when at least one of the connection devices 21 to 23 is connected to or disconnected from the mobile router 12. Alternatively, the mobile router 12 may transmit the network assist information to the NW node control device 32 at a timing when the connection devices 21 to 23 start or terminate communication via the mobile communication network 40. Alternatively, the mobile router 12 may transmit the network assist information to the NW node control device 32 at a timing when the mobile router 12 is attached to the network upon power activation. Alternatively, the mobile router 12 may transmit the network assist information to the NW node control device 32 at the time of shift from an idle state in which the mobile router 12 is disconnected from the mobile communication network 40 to a connected state in which the mobile router 12 is connected to the mobile communication network 40. In one more alternative, the mobile router 12 may periodically transmit the network assist information to the NW node control device 32.

The NW node 34 manages the network parameters related to the mobile communication apparatus which is connected to the mobile communication network 40 including the mobile router 12.

The NW node control device 32 transmits, to the NW node 34, an instruction message to change the network parameters managed by the NW node 34. The NW node control device 32 transmits, to the NW node 34, an instruction message to change the network parameters related to the mobile router 12 that are associated with the network assist information transmitted from the mobile router 12. The NW node 34 changes the network parameters based on the instruction message transmitted from the NW node control device 32. The NW node 34 may transfer, to another NW node 34, the instruction to change the network parameters that is transmitted from the NW node control device 32. In this manner, the NW node 34 may receive the instruction to change the network parameters directly from the NW node control device 32, or may receive the instruction to change the network parameters via another NW node 34.

Figure 3:
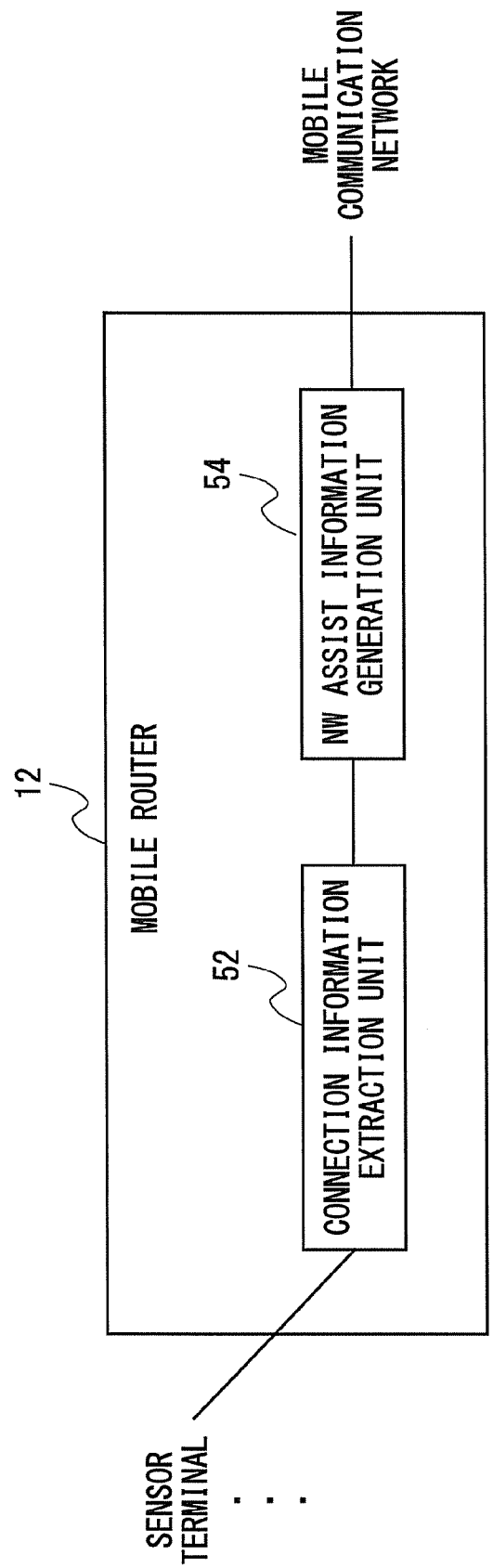
FIG. 3 is a block diagram showing a mobile router according to the second exemplary embodiment.

Next, a configuration example of the mobile router 12 according to the second exemplary embodiment of the present invention will be described with reference to FIG. 3. The mobile router 12 includes a connection information extraction unit 52 and a network assist information generation unit 54.

The connection information extraction unit 52 extracts connection information about the connection devices 21 to 23 which are connected to the mobile router 12. Further, the connection information extraction unit 52 outputs the extracted connection information to the network assist information generation unit 54.

The network assist information generation unit 54 generates network assist information by using the connection information output from the connection information extraction unit 52.

The connection information, network assist information, and network parameters will now be described in detail. First, a case where the number of connection devices connected to the mobile router 12 is detected as the connection information will be described.

When the mobile router 12 detects the connection information indicating that the number of connection devices connected to the mobile router 12 is greater than a predetermined number, the mobile router 12 may so determine the network assist information that the communication band allocated to the mobile router 12 is set to a value that is greater than the predetermined value. Specifically, when a large number of connection devices are connected to the mobile router 12, the amount of data communication between the mobile router 12 and the mobile communication network 40 is estimated to increase, and thus the communication band allocated to the mobile router 12 is enlarged. Further, when the NW node control device 32 receives the network assist information transmitted from the mobile router 12, the NW node control device 32 transmits, to the NW node 34, an instruction message to enlarge the communication band allocated to the mobile router 12, as a network parameter. When the mobile router 12 detects the connection information indicating that the number of connection devices connected to the mobile router 12 is smaller than the predetermined value, the mobile router 12 may so determine the network assist information that the communication band allocated to the mobile router 12 is set to a value smaller than the predetermined value.

Upon receiving information about the bandwidth required in the mobile router 12 as the network assist information, the NW node control device 32 may determine a bearer to be used by the mobile router 12. Examples of the bearer include radio bearers used in 2G/3G networks specified in the 3GPP; radio bearers used in LTE network specified in the 3GPP; radio bearers used in a wireless LAN; radio bearers used in PHS; and radio bearers used in Wimax.

When the mobile router 12 detects the connection information indicating that the number of connection devices connected to the mobile router 12 is greater than the predetermined value, the mobile router 12 may so determine the network assist information that the communication interval to be set in the mobile router 12 is set to a value smaller than the predetermined value. Specifically, when a large number of connection devices are connected to the mobile router 12, communication is expected to occur frequently between the mobile router 12 and the mobile communication network 40. Accordingly, the communication interval to be set in the mobile router 12 is reduced to thereby provide a number of communication opportunities to the mobile router 12. Upon receiving the network assist information transmitted from the mobile router 12, the NW node control device 32 transmits, to the NW node 34, an instruction message to reduce the communication interval set in the mobile router 12, as a network parameter. When the mobile router 12 detects the connection information indicating that the number of connection devices connected to the mobile router 12 is smaller than the predetermined value, the mobile router 12 may so determine the network assist information that the communication interval to be set in the mobile router 12 is set to a value greater than the predetermined value.

The network parameter indicating the communication interval may be an inactivity timer that defines the timing of a change from a state (connect mode) in which the mobile router 12 is connected to the mobile communication network 40 to a state (idle mode) in which the mobile router 12 is disconnected from the mobile communication network 40. The state in which the mobile router 12 is connected to the mobile communication network 40 is similar to the state in which the mobile router 12 is connected to the NW node 34.

Next, a case where the type of a device connected to the mobile router 12 is detected as the connection information will be described.

When the mobile router 12 detects the device whose amount of data communication is large, as the device connected to the mobile router 12, the mobile router 12 may determine the network assist information indicating that the communication band allocated to the mobile router 12 is set to a value greater than the predetermined value. When the mobile router 12 detects the device whose amount of data communication is small, as the device connected to the mobile router 12, the mobile router 12 may determine the network assist information indicating that the communication band allocated to the mobile router 12 is set to a value smaller than the predetermined value. After that, as in the case of detecting the number of connection devices as the connection information, the mobile router 12 transmits the network assist information to the NW node 34.

Examples of the device whose amount of data communication is large include a car navigation system and a game terminal. Examples of the device whose amount of data communication is small include a speaker and a temperature sensor. The classification of device types is not limited to the above-described classification. A user or the like who operates the mobile router 12 can change the classification of device types.

A case where the types of devices are classified into two categories, that is, a device having a large number of communication opportunities and a device having a small number of communication opportunities, will be described. Examples of the device having a large number of communication opportunities include a speaker, a temperature sensor, and a car navigation system. Examples of the device having a small number of communication opportunities include a game. The classification of the device types is not limited to the above-described classification. The user or the like who operates the mobile router 12 can change the classification of device types.

When the mobile router 12 detects a device having a large number of communication opportunities as a device connected to the mobile router 12, the mobile router 12 may determine the network assist information indicating that the communication interval to be set in the mobile router 12 is set to a value smaller than a predetermined value. When the mobile router 12 detects a device having a small number of communication opportunities as a device connected to the mobile router 12, the mobile router 12 may determine the network assist information indicating that the communication interval to be set in the mobile router 12 is set to a value greater than the predetermined value.

A case where the types of devices are classified into two categories, that is, a device with a high movement frequency and a device with a low movement frequency, will be described. Examples of the device with a high movement frequency include a pedometer and a device mounted on a vehicle. Examples of the device with a low movement frequency include a game. The classification of the device types is not limited to the above-described classification. The user or the like who operates the mobile router 12 can change the classification of the device types.

When the mobile router 12 detects a device with a high movement frequency as a device connected to the mobile router 12, the mobile router 12 may determine the network assist information indicating that the location registration area of the mobile router 12 is set to an area wider than a predetermined area. When the mobile router 12 detects that the rate of movement of the device connected to the mobile router 12 is high, the mobile router 12 may determine the network assist information indicating that the location registration area of the mobile router 12 is set to a much wider area.

Next, a case where the number of connection devices which are connected to the mobile router 12 and are in the active state or non-active state is detected as the connection information will be described.

When the mobile router 12 detects that the number of connection devices which are connected to the mobile router 12 and are in the active state is greater than a predetermined value, the mobile router 12 may determine the network assist information indicating that the communication band allocated to the mobile router 12 is set to a value greater than a predetermined value. When the mobile router 12 detects that the number of connection devices which are connected to the mobile router 12 and are in the active state is smaller than the predetermined value, the mobile router 12 may determine the network assist information indicating that the communication band allocated to the mobile router 12 is set to a value smaller than the predetermined value.

When the mobile router 12 detects that the number of connection devices which are connected to the mobile router 12 and are in the active state is greater than the predetermined value, the mobile router 12 may determine the network assist information indicating that the communication interval to be set in the mobile router 12 is set to a value smaller than the predetermined value. When the mobile router 12 detects that the number of connection devices which are connected to the mobile router 12 and are in the active state is smaller than the predetermined value, the mobile router 12 may determine the network assist information indicating that the communication interval to be set in the mobile router 12 is set to a value greater than the predetermined value.

Next, a case where information about the quality of communication between the mobile router 12 and the connection devices is detected as the connection information will be described.

When the mobile router 12 detects information indicating that the quality of communication between the mobile router 12 and the connection devices has deteriorated, the mobile router 12 may determine the network assist information indicating that the communication band allocated to the mobile router 12 is set to a value smaller than a predetermined value. In other words, when the quality of communication between the mobile router 12 and the connection devices has deteriorated, information indicating that the communication band is narrowed may be set as network information so as to suppress a loss of data transmitted and received between the mobile router 12 and the connection devices.

When the mobile router 12 detects information indicating that the quality of communication between the mobile router 12 and the connection devices has improved, the mobile router 12 may determine the network assist information indicating that the communication band allocated to the mobile router 12 is set to a value greater than the predetermined value.

When the mobile router 12 detects that the bandwidth used between the mobile router 12 and the connection devices 21 to 23 is higher than a predetermined value, the mobile router 12 may determine the network assist information indicating that the communication band allocated to the mobile router 12 is enlarged.

When the mobile router 12 detects that the bandwidth used between the mobile router 12 and the connection devices 21 to 23 is lower than the predetermined value, the mobile router 12 may determine the network assist information indicating that the communication band allocated to the mobile router 12 is set to be narrower than the current communication band.

Next, a case where information about the remaining battery level, which is a state of each connection device, is detected as the connection information will be described.

When the mobile router 12 detects information indicating that the remaining battery level of the connection device is lower than a predetermined value, the mobile router 12 may determine the network assist information indicating that the communication band allocated to the mobile router 12 is set to be narrower than a predetermined value, and may further determine the network assist information indicating that a reception period of an intermittent reception in the mobile router 12 is shortened. This is because it is predicted that when the remaining battery level of the connection device is low, the amount of data transmitted from the connection device is reduced to save the battery, which leads to a decrease in the number of communication opportunities.

When the mobile router 12 detects information indicating that the remaining battery level of the connection device is higher than the predetermined value, the mobile router 12 may determine the network assist information indicating that the communication band allocated to the mobile router 12 is set to be larger than the predetermined value, and may further determine the network assist information indicating that the intermittent reception period in the mobile router 12 is increased.

In this case, when the remaining battery level of the connection device is lower than the predetermined value, data transmitted from the connection device having a low remaining battery level can be preferentially transmitted to the mobile communication network 40 so that the data to be transmitted can be transmitted before the battery runs out. In such a case, the mobile router 12 may determine the network assist information indicating that the priority of communication related to the mobile router 12 is set to a high level.

The network assist information which is generated when the mobile router 12 detects, as the connection information, the number of connection devices connected to the mobile router 12, the type of the connection devices, the number of the connection devices in the active state, the quality of communication between the mobile router 12 and the connection devices, or the remaining battery level of the connection devices has been described above. The mobile router 12 may generate the network assist information by using, as the connection information, two or more pieces of information selected from the group consisting of: the number of the connection devices connected to the mobile router 12; the type of the connection devices; the number of the connection devices in the active state; the quality of communication between the mobile router 12 and the connection devices; and the remaining battery level of the connection devices.

For example, even in the case where the number of the connection devices connected to the mobile router 12 is smaller than the predetermined value, when the mobile router 12 detects a connection device having a large amount of data communication as a type of connection devices, the mobile router 12 may determine the network assist information indicating that the communication band allocated to the mobile router 12 is set to a value greater than the predetermined value. Even in the case where the number of the connection devices is larger than the predetermined value, when the number of the connection devices in the active state is smaller than the predetermined value, the mobile router 12 may determine the network assist information indicating that the communication band allocated to the mobile router 12 is set to a value smaller than the predetermined value.

Alternatively, the mobile router 12 may set the network assist information by using, as the connection information, two or more pieces of information selected from the group consisting of: the number of connection devices connected to the mobile router 12; the type of the connection devices; the number of the connection devices in the active state; the quality of communication between the mobile router 12 and the connection devices; and the remaining battery level of the connection devices, or by using all of these pieces of information.

As described above, the network assist information may be generated using at least one of information about the number of connected connection devices, the type of the connection devices, the number of the connection devices in the active state, the quality of communication between the mobile router and the connection devices, and the remaining battery level of the connection devices. The network assist information to be generated is not limited to the above examples. A user of the mobile router, an administrator of the mobile communication network, or the like may determine the network assist information according to a combination of pieces of connection information to be used and values indicated by the connection information.

Figure 4:
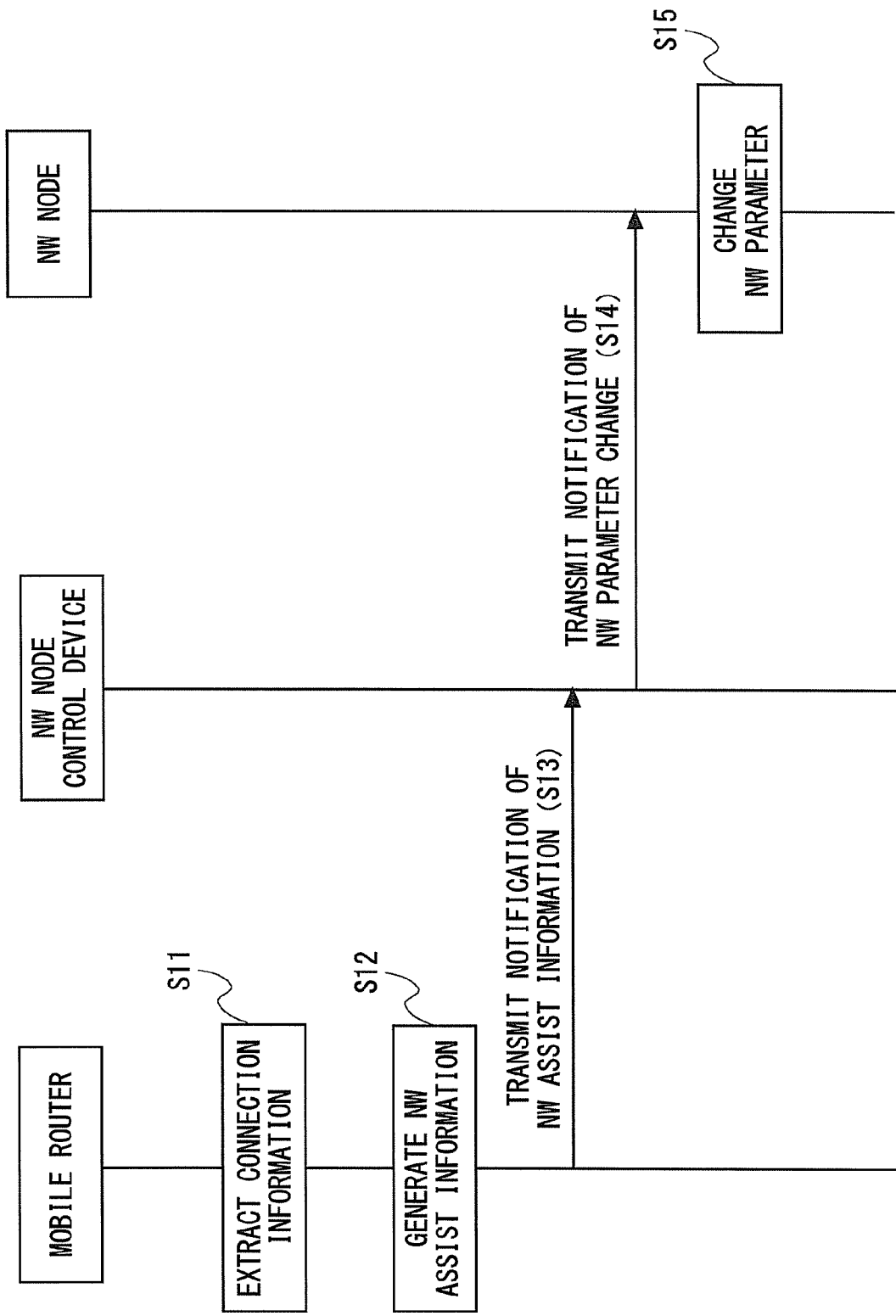
FIG. 4 is a diagram showing a flow of a process of changing a network parameter according to the second exemplary embodiment.

Next, a flow of a network parameter changing process according to the second exemplary embodiment of the present invention will be described with reference to FIG. 4.

First, the mobile router 12 extracts connection information about the connection devices connected to the mobile router 12 (S11). Next, the mobile router 12 generates network assist information by using the extracted connection information (S12). Then, the mobile router 12 transmits a network assist information notification message to the NW node control device 32 (S13). The mobile router 12 sets the generated network assist information in the network assist information notification message. The mobile router 12 may transmit the network assist information notification message to the NW node control device 32 via, for example, a base station and other devices disposed in the mobile communication network 40.

The NW node control device 32 determines a network parameter to be changed based on the network assist information sent from the mobile router 12. The NW node control device 32 transmits, to the NW node 34, a network parameter change notification message to indicate that the determined network parameter is to be changed (S14). Next, the NW node 34 changes the network parameter specified in the network parameter change notification message (S15).

As described above, the mobile router according to the second exemplary embodiment of the present invention can extract the connection information about the connection devices connected to the mobile router. The mobile router can also generate the network assist information based on the extracted connection information. The NW node control device 32 can change network parameters related to the mobile router, by using the network assist information generated in the mobile router. Thus, each network parameter related to the mobile router 12 can be set to an optimum value.

Third Exemplary Embodiment

Figure 5:
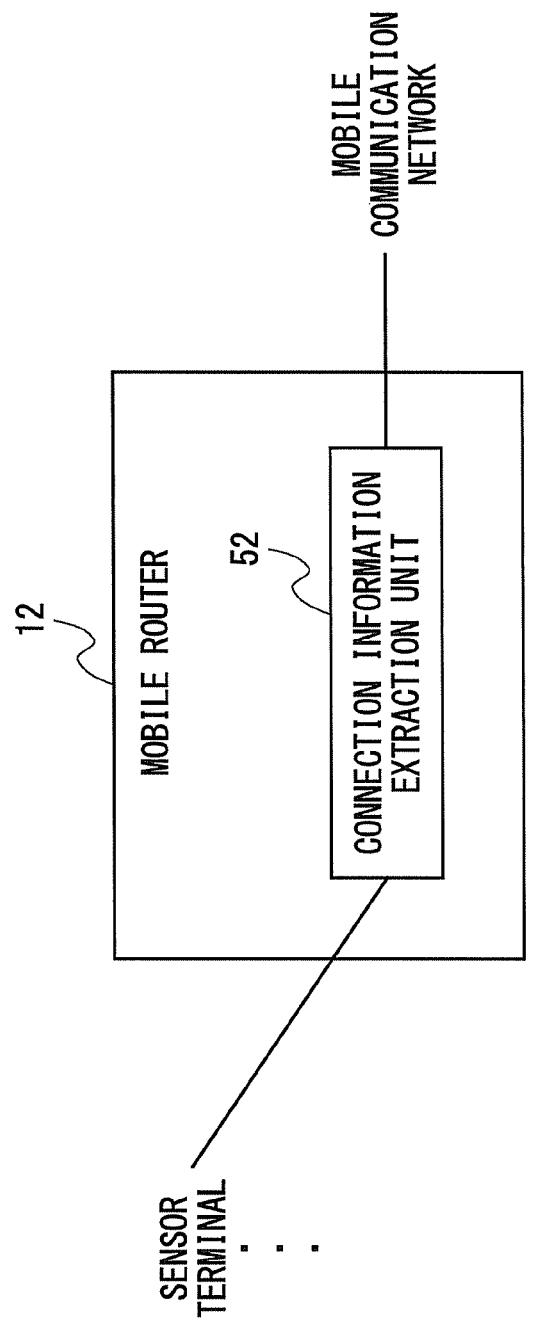
FIG. 5 is a block diagram showing a mobile router according to a third exemplary embodiment.

Next, a configuration example of the mobile router 12 according to a third exemplary embodiment of the present invention will be described with reference to FIG. 5. The mobile router 12 shown in FIG. 5 includes the connection information extraction unit 52. The mobile router 12 shown in FIG. 5 differs from the mobile router 12 shown in FIG. 3 in that the mobile router 12 shown in FIG. 5 does not include the network assist information generation unit 54. The connection information extraction unit 52 shown in FIG. 5 extracts connection information related to the connection devices connected to the mobile router, and transmits the extracted connection information to the NW node control device 32.

In this case, the mobile router 12 may transmit the connection information to the NW node control device 32 at a timing when at least one of the connection devices 21 to 23 is connected to or disconnected from the mobile router 12. Alternatively, the mobile router 12 may transmit the connection information to the NW node control device 32 at a timing when the connection devices 21 to 23 start or terminate communication via the mobile communication network 40. Alternatively, the mobile router 12 may transmit the connection information to the NW node control device 32 at a timing when the mobile router 12 is attached to the network upon power activation. Alternatively, the mobile router 12 may transmit the connection information to the NW node control device 32 at a timing of shift from the idle state in which the mobile router 12 is disconnected from the mobile communication network 40 to the connected state in which the mobile router 12 is connected to the mobile communication network 40. In one more alternative, the mobile router 12 may periodically transmit the connection information to the NW node control device 32.

The connection information extraction unit 52 sets the connection information in a control message, and transmits the control message to the NW node control device 32. The control message is a message different from user data such as voice data or image data. The control message may be referred to as C-Plane data.

Figure 6:
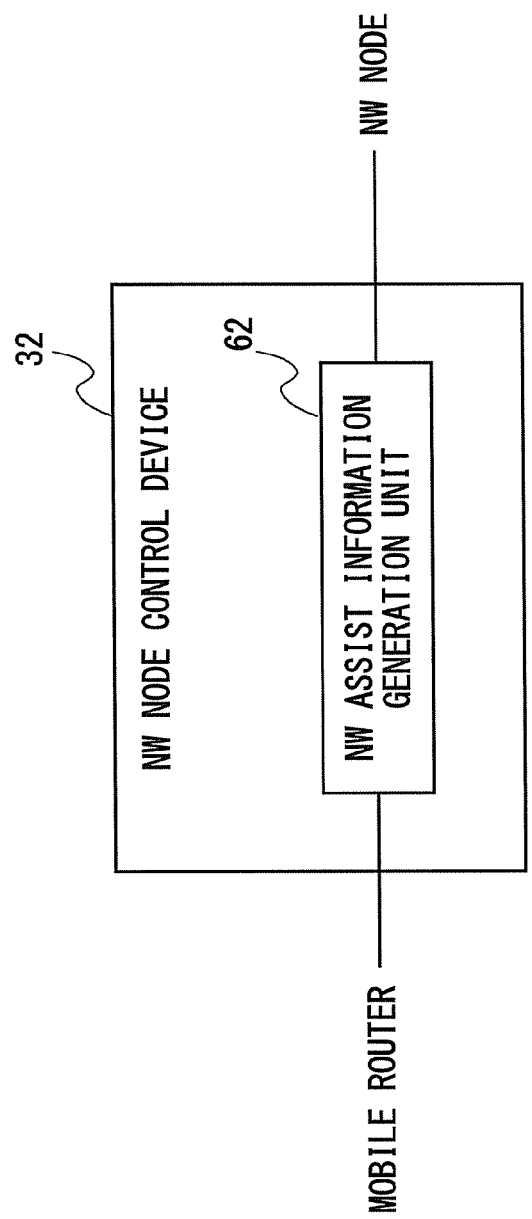
FIG. 6 is a block diagram showing a network node control device according to the third exemplary embodiment.

Next, a configuration example of the NW node control device 32 according to the third exemplary embodiment of the present invention will be described with reference to FIG. 6. The NW node control device 32 shown in FIG. 6 includes a network assist information generation unit 62. The network assist information generation unit 62 has the same function as that of the network assistant information generation unit 54 shown in FIG. 3, and thus the detailed description thereof is omitted. The network assist information generation unit 62 generates network assist information according to the connection information transmitted from the connection information extraction unit 52 of the mobile router 12.

Figure 7:
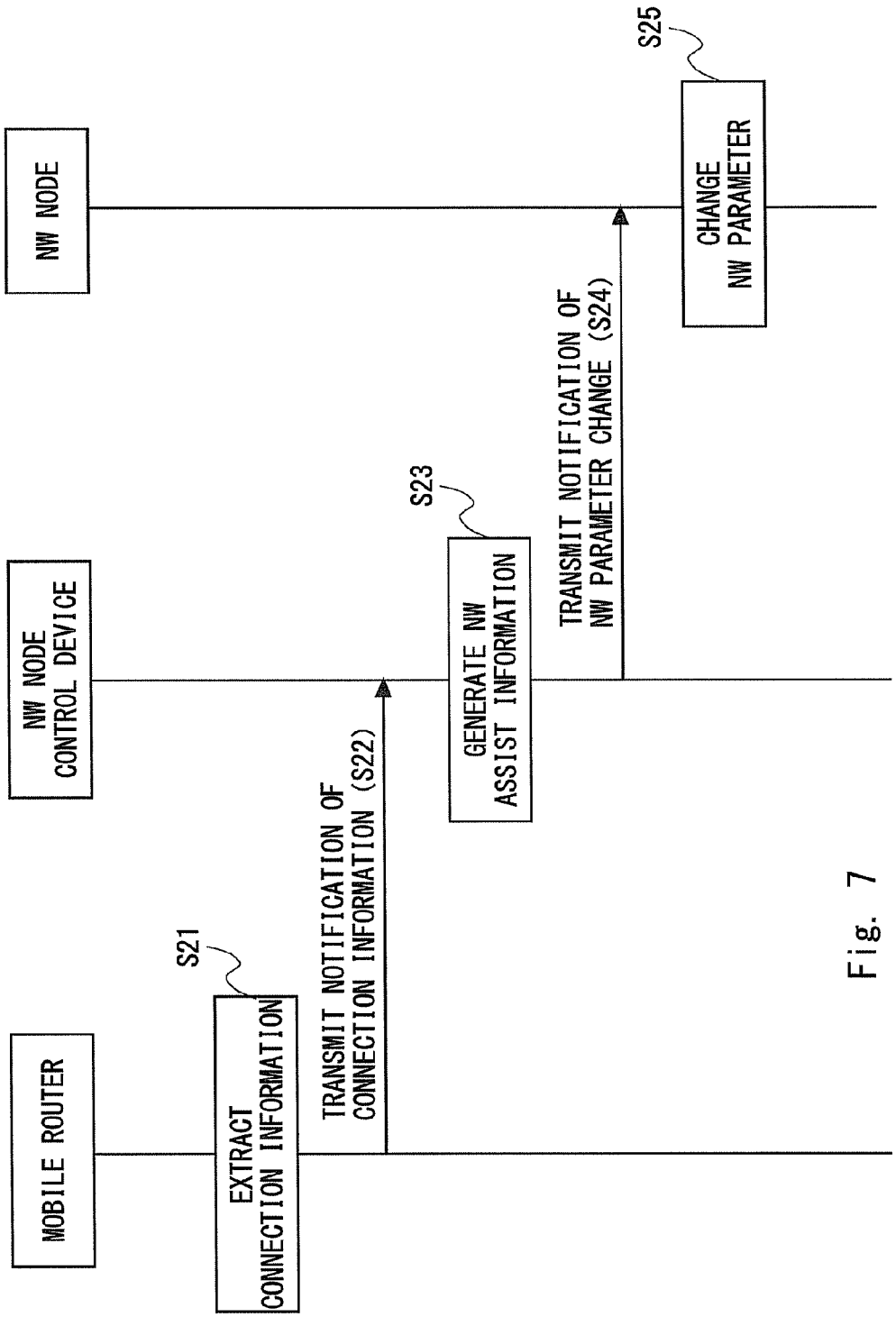
FIG. 7 is a diagram showing a flow of a process of changing a network parameter according to the third exemplary embodiment.

Next, a flow of a network parameter changing process according to the third exemplary embodiment of the present invention will be described with reference to FIG. 7.

First, the mobile router 12 extracts connection information about the connection devices connected to the mobile router 12 (S21). Next, the mobile router 12 transmits the extracted connection information to the NW node control device 32 (S22). Then, the NW node control device 32 generates network assist information according to the connection information transmitted from the mobile router 12 (S23).

The NW node control device 32 determines a network parameter to be changed based on the generated network assist information. The NW node control device 32 transmits, to the NW node 32, the network parameter change notification message indicating that the determined network parameter is to be changed (S24). Next, the NW node 34 changes the network parameter specified in the network parameter change notification message (S25).

As described above, the mobile router 12 according to the third exemplary embodiment of the present invention extracts connection information about the connection devices connected to the mobile router, and transmits the extracted connection information to the NW node control device 32. The NW node control device 32 generates network assist information according to the connection information transmitted from the mobile router 12. In the third exemplary embodiment, the extraction of the connection information and the generation of the network assist information are executed in different devices, which leads to a reduction in the processing load per device as compared with the case of executing these processes in one device.

Fourth Exemplary Embodiment

Figure 8:
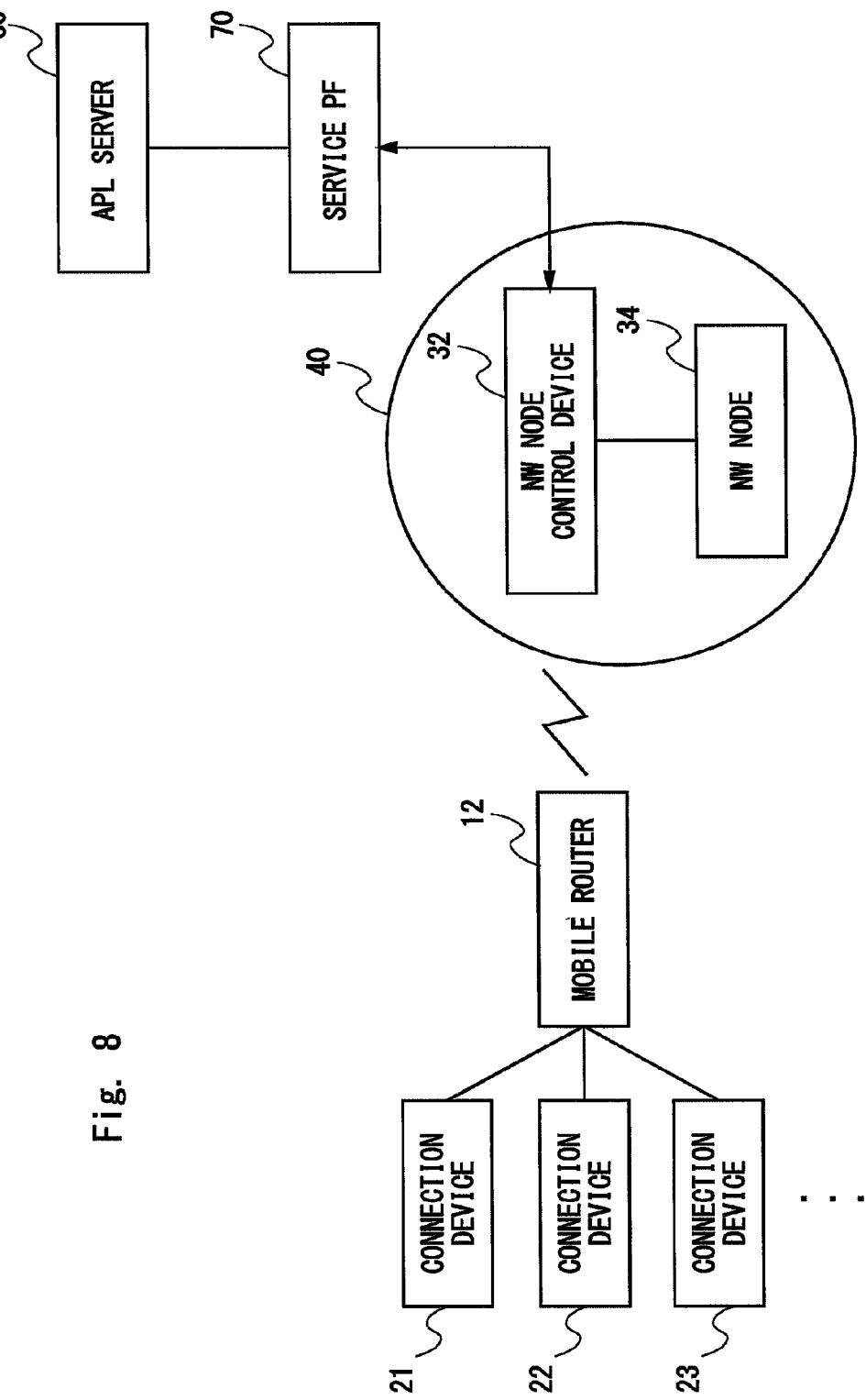
FIG. 8 is a block diagram showing a mobile communication system according to a fourth exemplary embodiment.

Next, a configuration example of a mobile communication system according to a fourth exemplary embodiment of the present invention will be described with reference to FIG. 8. The mobile communication system shown in FIG. 8 has a configuration in which a service platform (PR) 70 and an application (APL) server 80 are added to the mobile communication system shown in FIG. 2.

The APL server 80 is a device managed by an application service provider. The application service provider is, for example, a company that provides an application service. The application service provider may be a provider different from a mobile communication carrier. In other words, an application server may be disposed in a network which is managed by a management policy different from that of a mobile communication network managed by a mobile communication carrier. The APL server 80 receives sensor information or the like transmitted from the connection devices 21 to 23, which are connected to the mobile router 12, and provides services using the received sensor information or the like.

The service PF 70 is, for example, a group of devices managed by a service provider. Accordingly, the service PF 70 may be composed of a plurality of server devices, or may be composed of a single server device. The service provider may be, for example, a provider which transmits data, which is generated by the APL server 80 to provide the application service, to the communication devices connected via the mobile communication network 40. The service PF 70 may be connected to a plurality of APL servers 80 of different application service providers.

The service PF 70 receives the connection information transmitted from the mobile router 12. Further, the service PF 70 generates network assist information according to the received connection information.

The service provider may be a provider different from a mobile communication carrier and an application service provider. In other words, the service PF 70 may be disposed in a network which is managed by a management policy different from that of networks managed by a mobile communication carrier and an application service provider. The service provider and the application service provider may be the same provider, and the service PF 70 and the APL server 80 may be disposed in networks managed by the same management policy. The service provider and the mobile communication carrier may be the same provider, and the service PF 70 and the NW node control device 32 may be disposed in networks managed by the same management policy. The service provider, the mobile communication carrier, and the application service provider may be the same provider, and the service PF 70, the APL server 80, and the NW node control device 32 may be disposed in networks managed by the same management policy.

Figure 9:
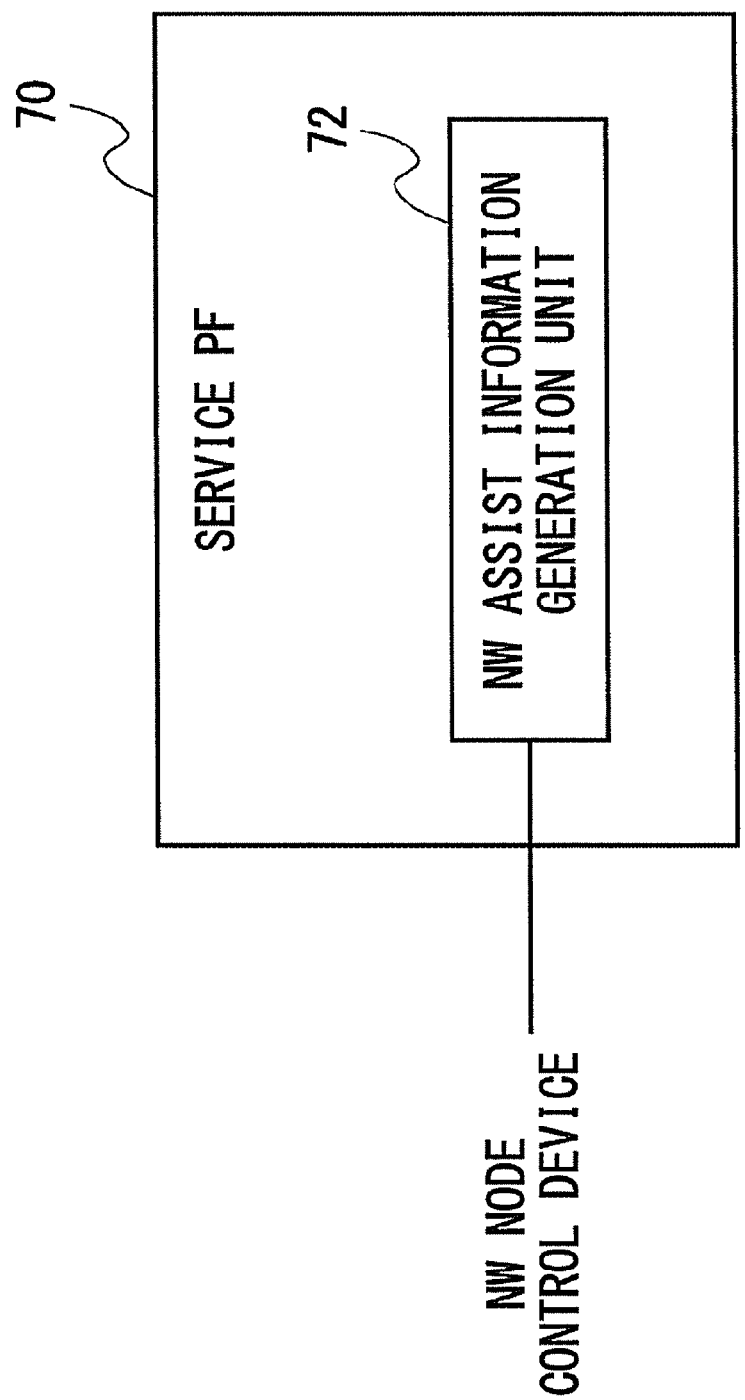
FIG. 9 is a block diagram showing a service platform according to the fourth exemplary embodiment.

A configuration example of the service PF 70 according to the fourth exemplary embodiment of the present invention will now be described with reference to FIG. 9. The service PF 70 includes a network assist information generation unit 72. The network assist information generation unit 72 receives the connection information transmitted from the mobile router 12. The network assist information generation unit 72 may receive the connection information transmitted from the mobile router 12 via the mobile communication network 40, or may receive the connection information transmitted via a network different from the mobile communication network 40. The network assist information generation unit 72 may also receive the connection information included in user data transmitted from the mobile router 12.

Figure 10:
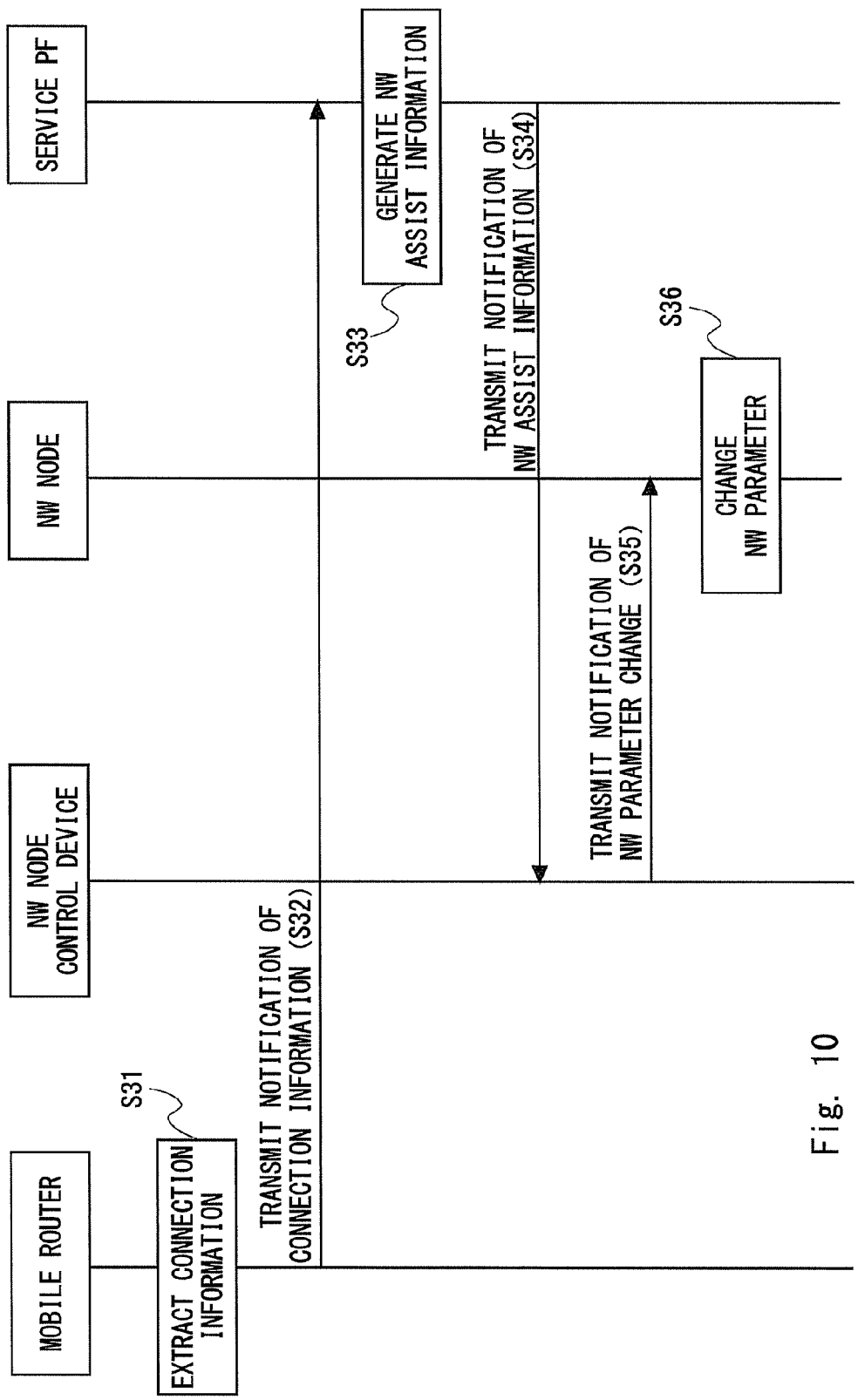
FIG. 10 is a diagram showing a flow of a process of changing a network parameter according to the fourth exemplary embodiment.

Next, a flow of a network parameter changing process according to the fourth exemplary embodiment of the present invention will be described with reference to FIG. 10. First, the mobile router 12 extracts connection information about the connection devices connected to the mobile router 12 (S31). Next, the mobile router 12 transmits the extracted connection information to the service PF 70 (S32). For example, the mobile router 12 may transmit the connection information as application data to the service PF 70. The application data may be referred to as, for example, user data. Examples of the application data include voice data, image data, and music data.

Next, the service PF 70 generates network assist information by using the connection information transmitted from the mobile router 12 (S33). Then, the service PF 70 transmits the network assist information notification message to the NW node control device 32. The network assist information notification message includes the network assist information generated in the service PF 70.

The NW node control device 32 determines a network parameter to be changed based on the generated network assist information. The NW node control device 32 transmits, to the NW node 34, the network parameter change notification message indicating that the determined network parameter is to be changed (S35). Next, the NW node 34 changes the network parameter specified in the network parameter change notification message (S36).

The above example illustrates the flow of the process in which the mobile router 12 extracts the connection information and the service PF 70 generates the network assist information. In this case, when the mobile router 12 has the configuration shown in FIG. 3, the mobile router 12 may generate the network assist information and transmit the generated network assist information to the service PF 70. In this case, the service PF 70 transmits the network assist information, which is transmitted from the mobile router 12, to the NW node control device 32.

Next, a specific use case using the mobile communication system shown in FIG. 8 will be described. A case where a monitoring server of a transfer company is used as the APL server 80 will be described. Each truck of the transfer company delivers packages from local areas to their destinations via collection points. At this time, the transfer company attaches a temperature sensor, a vibration sensor, or the like to each package as the connection device 21. Each truck includes the mobile router 12. The sensors attached to the respective packages periodically transmit sensor information to the monitoring server via the mobile router 12. The sensors and the mobile router 12 may communicate with each other by near field communication.

The monitoring server acquires the sensor information periodically transmitted from the sensors, and manages the quality or temperature of each package.

The mobile router 12 transmits the sensor information, which is transmitted from the connected sensors, to the monitoring server. Further, the mobile router 12 detects connection information about the number of connected sensors, the type of the sensors, the number of the sensors in the active state, or the like, and transmits the detected connection information to the service PF 70.

The service PF 70 generates network assist information according to the transmitted connection information. The service PF 70 may generate network assist information to instruct the mobile router 12 connected with a number of sensors, for example, to enlarge the communication band, and may transmit the generated network assist information to the NW node control device 32.

The NW node control device 32 determines a network parameter to be changed based on the transmitted network assist information, and notifies the NW node 34 of the determined information. The NW node 34 changes the network parameter based on the notified information.

In this manner, the provision of the mobile router 12 for each truck, which delivers a plurality of packages, enables the service PF 70 to collect the connection information in the mobile router 12 from the mobile router 12. The service PF 70 can use the collected connection information to generate the network assist information in such a manner that the network parameter in the mobile communication network 40 is set to an optimum value, and can notify the NW node control device 32 of the generated network assist information.

Figure 11:
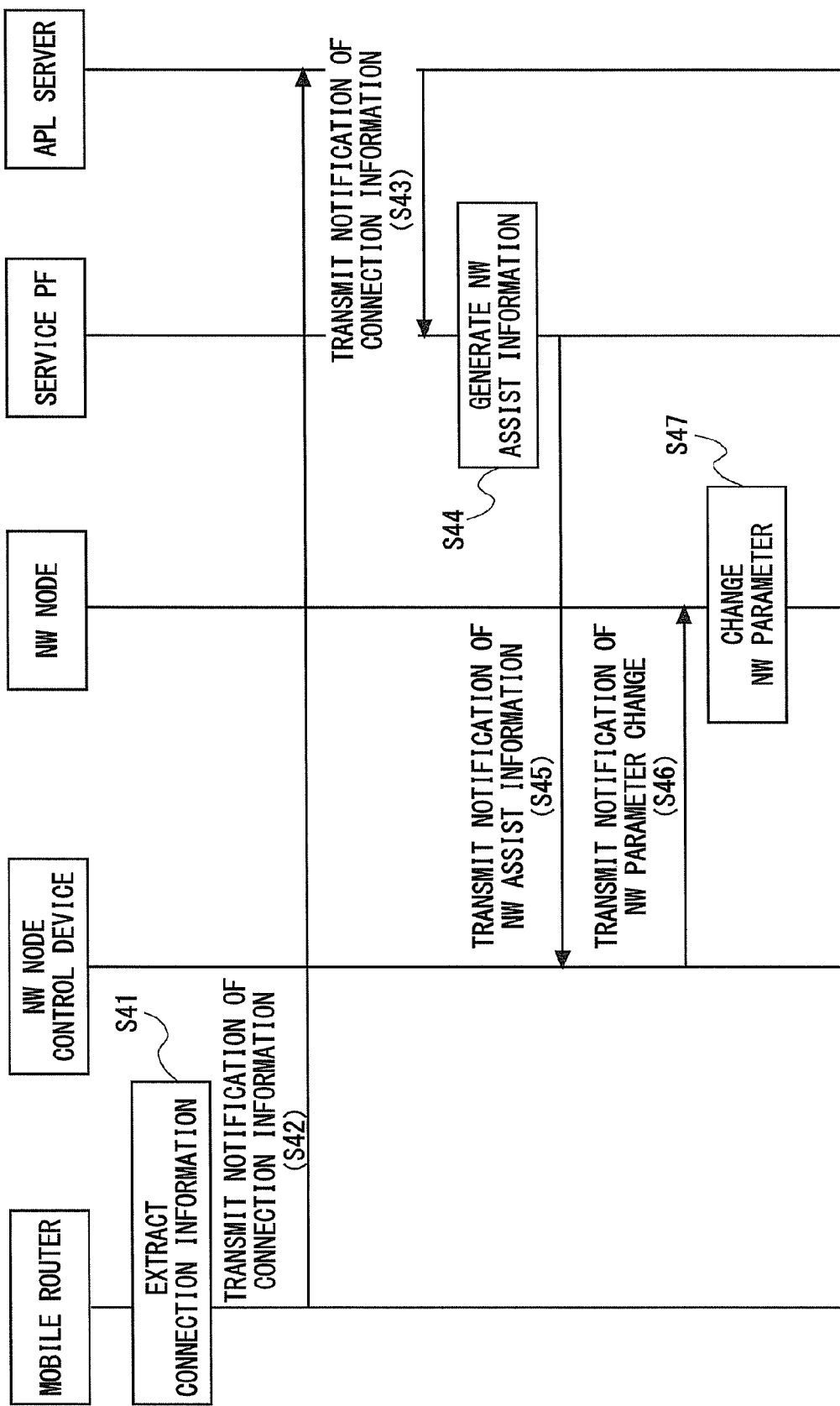
FIG. 11 is a diagram showing a flow of a process of changing a network parameter according to the fourth exemplary embodiment.
Figure 12:
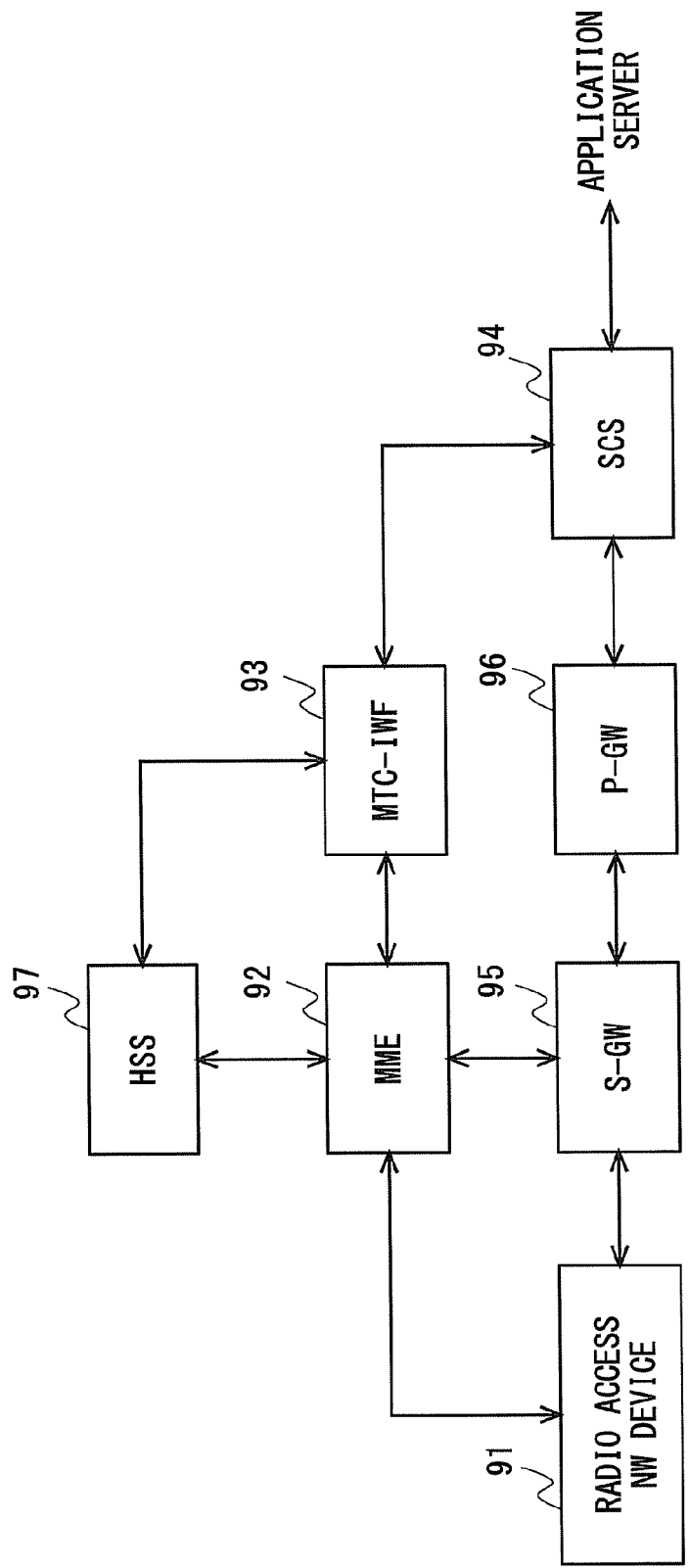
FIG. 12 is a block diagram showing a mobile communication network according to a fifth exemplary embodiment.

Referring to FIG. 12, a flow of a network parameter changing process different from that shown in FIG. 10 will be described. First, the mobile router 12 extracts connection information about the connection devices connected to the mobile router 12 (S41). Next, the mobile router 12 transmits the extracted connection information to the APL server 80 (S42). For example, the mobile router 12 may transmit the connection information as application data to the APL server 80. In the flow shown in FIG. 10, the mobile router 12 transmits the extracted connection information to the service PF 70, while in the flow shown in FIG. 11, the mobile router 12 transmits the extracted connection information to the APL server 80.

Next, the APL server 80 transmits the connection information, which is transmitted from the mobile router 12, to the service PF 70 (S43). Steps S44 to S47 are similar to steps S33 to S36 shown in FIG. 10, and thus the detailed descriptions thereof are omitted. The APL server 80 shown in FIG. 11 may collect the connection information transmitted from the mobile router 12, by using, for example, a device management function specified as OMA-DM (Open Mobile Alliance-Device Management).

As described above, the communication system according to the fourth exemplary embodiment of the present invention includes the service PF 70 and the APL server 80. In this exemplary embodiment, the mobile router 12 transmits the connection information to the service PF 70 disposed in a network outside of the mobile communication network 40. Alternatively, the mobile router 12 may transmit the connection information to the APL server 80, and the APL server 80 may transmit the connection information to the service PF 70. Further, the service PF 70 can generate the network assist information according to the received connection information. Since the mobile router 12 can transmit the connection information as user data to the service PF 70, there is no need to define a new control message between the mobile router 12 and the mobile communication network 40.

This exemplary embodiment illustrates a process flow in which the mobile router 12 transmits the connection information to the service PF 70. However, the mobile router 12 may generate the network assist information and transmit the generated network assist information to the service PF 70. In this case, the service PF 70 transmits the network assist information, which is transmitted from the mobile router 12, to the NW node control device 32.

Fifth Exemplary Embodiment

Next, a configuration example of the mobile communication network 40 according to a fifth exemplary embodiment of the present invention will be described with reference to FIG. 12. Referring to FIG. 12, an example in which a mobile communication carrier uses the mobile communication network 40 specified in the 3GPP (3rd Generation Partnership Project) will be described. In the configuration shown in FIG. 12, a radio access NW device 91, an HSS 97, an MME (Mobility Management Entity) 92, an S-GW (Serving Gateway) 95, and a P-GW (Packet Data Network Gateway) 96 correspond to the NW node 34. The NW node 34 may include a PCRF which is a node device specified in the 3GPP.

An MTC-IWF 93 corresponds to the NW node control device 32. An SCS 94 corresponds to the service PF 70.

The radio access NW device 91 may be a base station. The radio access NW device 91 may also be an eNB which is a base station when LTE (Long Term Evolution) is used as a radio system. The MME 92 mainly performs mobile management of the M2M device 21. The SCS 94 is a communication node which is provided to communicate with an application server. For example, sensor information or the like is transmitted and received between the SCS 94 and the application server. The SCS 94 outputs network assist information to the MTC-IWF 93. Tsp interface specified in the 3GPP is used as the interface between the MTC-IWF 93 and the SCS 94. Diameter protocol is used for the Tsp interface.

The S-GW 95 and the P-GW 96 transmit and receive user data, such as voice data or image data, which is transmitted from the mobile router 12. The S-GW 95 and the P-GW 96 relay the user data transmitted via the radio access NW device 91, and output the user data to the SCS 94.

The MTC-IWF 93 changes the NW parameter related to the mobile router 12 managed by the HSS 97, the MME 92, the S-GW 95, the P-GW 96, and the like, based on the network assist information output from the SCS 94. In a case where the NW parameter related to the mobile router 12 is managed by the MME 92 and the HSS 97, the MTC-IWF 93 changes the NW parameter related to the mobile router 12 that is managed by the MME 92 and the HSS 97. Alternatively, when the NW parameter related to the mobile router 12 that is managed by the eNB, which includes the S-GW 95, the P-GW 96, and the radio access NW device 91, is changed based on the network assist information output from the SCS 94, the MTC-IWF 93 may change the NW parameter of each device via the MME 92. Cases where Inactivity Timer, Connection keep time, DRX Timer, Backoff Timer, a guaranteed bandwidth parameter, or the like is used as the NW parameter will be described in detail below.

In the case of changing Inactivity Timer, Connection keep time, or DRX Timer, the MTC-IWF 93 outputs a change instruction message to the HSS 97 or the MME 92. Further, the MTC-IWF 93 outputs a change instruction message to the eNB so as to change the parameter related to Inactivity Timer or the like that is held by the eNB.

In the case of changing Backoff Timer, the MTC-IWF 93 outputs the change instruction message to the MME 92. In the case of changing a communication policy, QCI (QoS), a guaranteed bandwidth parameter, or the like, the MTC-IWF 93 outputs the change instruction message to the PCRF, the S-GW 95, and the P-GW 96. The MTC-IWF 93 can change, as needed, the output destination of the change instruction message, for example, when the device that manages the NW parameter is changed, or another device for managing the NW parameter is provided.

As described above, the use of the mobile communication system according to the fifth exemplary embodiment of the present invention makes it possible to change the NW parameter, which is managed by the HSS 95 or the MME 92, to an optimum value based on the network assist information related to the mobile router 12 that is sent from the service PF 70, even when the network specified in the 3GPP is used.

The network shown in FIG. 12 has been described above by using a configuration example of an EPC (Evolved Packet Core) used in the LTE. However, also in the case of UMTS, a network may be constructed using the same idea as that in the example of LTE. For example, in the case of UMTS, the operation of the MME 92 shown in FIG. 12 may be performed by the control plane of an SGSN (Serving GPRS Support Node). The operation of the HSS 97 may be performed by an HLR (Home Location Register). The operation of the S-GW 95 may be performed by the user plane function of the SGSN. The operation of the P-GW 96 may be performed by a GGSN (Gateway GPRS Support Node). The operation of the radio access NW device 91 may be performed by an RNC (Radio Network Controller).

Although the present invention has been described as a hardware configuration in the above exemplary embodiments, the present invention is not limited to this. The present invention can also implement the process of extracting connection information or the process of generating network assist information in the mobile router 12, the NW node control device 32, or the service PF 70, by causing a CPU (Central Processing Unit) to execute a computer program.

In the above-mentioned example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

Note that the present invention is not limited to the above exemplary embodiments, and can be modified as appropriate without departing from the scope of the invention.

The present invention has been described above with reference to exemplary embodiments. However, the present invention is not limited to the above exemplary embodiments. The configuration and details of the present invention can be modified in various manners which can be understood by those skilled in the art within the scope of the invention.

This application is based upon and claims the benefit of priority from Japanese patent application No. 2013-109018, filed on May 23, 2013, the disclosure of which is incorporated herein in its entirety by reference.

REFERENCE SIGNS LIST

10 MOBILE COMMUNICATION APPARATUS
12 MOBILE ROUTER
21 CONNECTION DEVICE
22 CONNECTION DEVICE
23 CONNECTION DEVICE
30 NETWORK OPERATOR DEVICE
32 NW NODE CONTROL DEVICE
34 NW NODE
40 MOBILE COMMUNICATION NETWORK
52 CONNECTION INFORMATION EXTRACTION UNIT
54 NETWORK ASSIST INFORMATION GENERATION UNIT
62 NETWORK ASSIST INFORMATION GENERATION UNIT
70 SERVICE PF
72 NETWORK ASSIST INFORMATION GENERATION UNIT
80 APL SERVER

The invention claimed is:

1. A mobile communication system comprising:
a mobile communication apparatus connected to a plurality of connection devices; and
a MTC-IWF (Machine Type Communication Inter Working Function) in a mobile communication network managed by a mobile communication carrier, wherein
the mobile communication apparatus detects connection information about the connection devices, and
the MTC-IWF changes a network parameter or a network process associated with the mobile communication apparatus based on network assist information determined according to the connection information about the connection devices, the connection information being detected by the mobile communication apparatus, the network parameter being a value for determining resource information used by the mobile communication apparatus to perform wireless communication, and the network assist information being information used to adjust or optimize the network parameter managed by at least one of an HSS (home subscriber server), an MME (mobility management entity), an S-GW (serving gateway), and a P-GW (packet data network gateway).

2. The mobile communication system according to claim 1,
wherein the connection information includes at least one of:
information about the number of the connection devices connected to the mobile communication apparatus;
information about a type of the connection devices connected to the mobile communication apparatus;
information about the number of the connection devices in an active state;
information about a quality of communication between the mobile communication apparatus and the connection devices; and
information about a state of the connection devices.

3. The mobile communication system according to claim 1,
wherein the MTC-IWF changes, based on the network assist information, at least one of network parameters including:
a communication interval in the mobile communication apparatus,
a communication bandwidth required in the mobile communication apparatus, and
a location registration area of the mobile communication apparatus.

4. The mobile communication system according to claim 1,
wherein the network assist information is information generated based on the connection information so as to adjust a network parameter associated with the mobile communication apparatus.

5. The mobile communication system according to claim 1,
wherein the mobile communication apparatus generates the network assist information according to the detected connection information, and transmits the generated network assist information to the MTC-IWF.

6. The mobile communication system according to claim 1, further comprising:
a service platform that provides an application service by using information acquired from the mobile communication apparatus that performs communication via the mobile communication network, wherein:
the mobile communication apparatus generates the network assist information according to the detected connection information, and transmits the generated network assist information to the service platform, and
the service platform transmits the network assist information to the MTC-IWF, the network assist information being transmitted from the mobile communication apparatus.

7. The mobile communication system according to claim 5,
wherein the mobile communication apparatus transmits the network assist information at a time when the connection device is connected to or disconnected from the mobile communication apparatus, at a time when the connection device starts or terminates communication via the mobile communication apparatus, at a time when the mobile communication apparatus is connected to a radio access NW (network) device upon power activation, or at a predetermined time.

8. The mobile communication system according to claim 1, wherein:
the mobile communication apparatus transmits the detected connection information to the MTC-IWF, and the MTC-IWF generates the network assist information according to the connection information.

9. The mobile communication system according to claim 1, further comprising:
a service platform that provides an application service by using information acquired from the mobile communication apparatus that performs communication via the mobile communication network, wherein:
the mobile communication apparatus transmits the detected connection information to the service platform,
the service platform transmits the connection information to the MTC-IWF, the connection information being transmitted from the mobile communication apparatus, and
the MTC-IWF generates the network assist information according to the connection information transmitted from the service platform.

10. The mobile communication system according to claim 1, further comprising:
a service platform that provides an application service by using information acquired from the mobile communication apparatus that performs communication via the mobile communication network, wherein:
the mobile communication apparatus transmits the detected connection information to the service platform, and
the service platform generates the network assist information according to the connection information transmitted from the mobile communication apparatus, and transmits the generated network assist information to the MTC-IWF.

11. The mobile communication system according to claim 8,
wherein the mobile communication apparatus transmits the connection information at a time when the connection device is connected to or disconnected from the mobile communication apparatus, at a time when the connection device starts or terminates communication via the mobile communication apparatus, at a time when the mobile communication apparatus is connected to a radio access NW (network) device upon power activation, or at a predetermined time.

12. The mobile communication system according to claim 1,
wherein when a type of a connection device which is expected to move is detected as the connection information, information indicating that the mobile communication apparatus is to move, or information indicating that a location registration area of the mobile communication apparatus is to be changed, is set as the network assist information.

13. A mobile communication apparatus comprising:
memory storing instructions; and
one or more processors configured to execute the instructions to function as:
a connection information extraction unit that detects connection information about a plurality of connection devices connected to the mobile communication apparatus; and
a network assist information generation unit that generates network assist information used to change a network parameter or a network process associated with the mobile communication apparatus according to the connection information, and for transmitting the generated network assist information to an MTC-IWF (Machine Type Communication Inter Working Function) disposed in a mobile communication network managed by a mobile communication carrier, the network parameter being a value for determining resource information used by the mobile communication apparatus to perform wireless communication, and the network assist information being information used to adjust or optimize the network parameter managed by at least one of an HSS (home subscriber server), an MME (mobility management entity), an S-GW (serving gateway), and a P-GW (packet data network gateway).

14. The mobile communication apparatus according to claim 13,
wherein the connection information includes at least one of:
information about the number of the connection devices connected to the mobile communication apparatus;
information about a type of the connection devices connected to the mobile communication apparatus;
information about the number of the connection devices in an active state;
information about a quality of communication between the mobile communication apparatus and the connection devices; and
information about a state of the connection devices.

15. The mobile communication apparatus according to claim 13,
wherein the network assist information is information generated based on the connection information so as to adjust a network parameter associated with the mobile communication apparatus.

16. The mobile communication apparatus according to any one of claim 13,
wherein the network assist information generation means unit transmits the network assist information at a time when the connection device is connected to or disconnected from the mobile communication apparatus, at a time when the connection device starts or terminates communication via the mobile communication apparatus, at a time when the mobile communication apparatus is connected to a radio access NW (network) device upon power activation, or at a predetermined time.

17. A mobile communication apparatus comprising:
memory storing instructions; and
one or more processors configured to execute the instructions to function as:
a connection information extraction unit that detects connection information about a plurality of connection devices connected to the mobile communication apparatus, and for transmitting the connection information to an MTC-IWF (Machine Type Communication Inter Working Function) so as to generate network assist information used to change a network parameter or a network process associated with the mobile communication apparatus according to the connection information, the MTC-IWF being disposed in a mobile communication network, the network parameter being a value for determining resource information used by the mobile communication apparatus to perform wireless communication, and the network assist information being information used to adjust or optimize the network parameter managed by at least one of an HSS (home subscriber server), an MME (mobility management entity), an S-GW (serving gateway), and a P-GW (packet data network gateway).

18. The mobile communication apparatus according to claim 17,
wherein the connection information extraction unit transmits the connection information at a time when the connection device is connected to or disconnected from the mobile communication apparatus, at a time when the connection device starts or terminates communication via the mobile communication apparatus, at a time when the mobile communication apparatus is connected to a radio access NW (network) device upon power activation, or at a predetermined time.

19. A mobile communication apparatus comprising:
memory storing instructions; and
one or more processors configured to execute the instructions to function as:
a connection information extraction unit that detects connection information about a plurality of connection devices connected to the mobile communication apparatus, and for transmitting the connection information to a service platform so as to generate network assist information used to change a network parameter or a network process associated with the mobile communication apparatus according to the connection information, the service platform being connected to an application server, the network parameter being a value for determining resource information necessary for the mobile communication apparatus to perform wireless communication, and the network assist information being information used to adjust or optimize the network parameter managed by at least one of an HSS (home subscriber server), an MME (mobility management entity), an S-GW (serving gateway), and a P-GW (packet data network gateway).

20. The mobile communication apparatus according to claim 19,
wherein the connection information extraction unit transmits the connection information at a time when the connection device is connected to or disconnected from the mobile communication apparatus, at a time when the connection device starts or terminates communication via the mobile communication apparatus, at a time when the mobile communication apparatus is connected to a radio access NW (network) device upon power activation, or at a predetermined time.

21. A network assist information transmission method, comprising:
detecting, by a mobile communication apparatus, connection information about a plurality of connection devices connected to an apparatus;
generating, by the mobile communication apparatus, network assist information used to change a network parameter or a network process associated with the apparatus according to the connection information, the network parameter being a value for determining resource information used by the mobile communication apparatus to perform wireless communication, and the network assist information being information used to adjust or optimize the network parameter managed by at least one of an HSS (home subscriber server), an MME (mobility management entity), an S-GW (serving gateway), and a P-GW (packet data network gateway); and
transmitting, by the mobile communication apparatus, the generated network assist information to an MTC-IWF (Machine Type Communication Inter Working Function) disposed in a mobile communication network managed by a mobile communication carrier.

22. A connection information transmission method, comprising:
detecting, by a mobile communication apparatus, connection information about a plurality of connection devices connected to an apparatus; and
transmitting, by the mobile communication apparatus, the connection information to an MTC-IWF (Machine Type Communication Inter Working Function) so as to generate network assist information used to change a network parameter or a network process associated with the apparatus according to the connection information, the MTC-IWF being disposed in a mobile communication network, the network parameter being a value for determining resource information used by the mobile communication apparatus to perform wireless communication, and the network assist information being information used to adjust or optimize the network parameter managed by at least one of an HSS (home subscriber server), an MME (mobility management entity), an S-GW (serving gateway), and a P-GW (packet data network gateway).

23. A connection information transmission method, comprising:
detecting, by a mobile communication apparatus, connection information about a plurality of connection devices connected to an apparatus; and
transmitting, by the mobile communication apparatus, the connection information to a service platform so as to generate network assist information used to change a network parameter or a network process associated with the apparatus according to the connection information, the service platform being connected to an application server, the network parameter being a value for determining resource information used by the mobile communication apparatus to perform wireless communication, and the network assist information being information used to adjust or optimize the network parameter managed by at least one of an HSS (home subscriber server), an MME (mobility management entity), an S-GW (serving gateway), and a P-GW (packet data network gateway).

24. A non-transitory computer readable medium storing a program for causing a computer to execute the steps of:
detecting connection information about a plurality of connection devices connected to an apparatus;
generating network assist information used to change a network parameter or a network process associated with the apparatus according to the connection information, the network parameter being a value for determining resource information used by the mobile communication apparatus to perform wireless communication, and the network assist information being information used to adjust or optimize the network parameter managed by at least one of an HSS (home subscriber server), an MME (mobility management entity), an S-GW (serving gateway), and a P-GW (packet data network gateway); and
transmitting the generated network assist information to an MTC-IWF (Machine Type Communication Inter Working Function) disposed in a mobile communication network managed by a mobile communication carrier.

25. A non-transitory computer readable medium storing a program for causing a computer to execute the steps of:

detecting connection information about a plurality of connection devices connected to an apparatus; and transmitting the connection information to an MTC-IWF (Machine Type Communication Inter Working Function) so as to generate network assist information used to change a network parameter or a network process associated with the apparatus according to the connection information, the MTC-IWF being disposed in a mobile communication network, the network parameter being a value for determining resource information used by the mobile communication apparatus to perform wireless communication, and the network assist information being information used to adjust or optimize the network parameter managed by at least one of an HSS (home subscriber server), an MME (mobility management entity), an S-GW (serving gateway), and a P-GW (packet data network gateway).

26. A non-transitory computer readable medium storing a program for causing a computer to execute the steps of:

detecting connection information about a plurality of connection devices connected to an apparatus; and transmitting the connection information to a service platform so as to generate network assist information used to change a network parameter or a network process associated with the apparatus according to the connection information, the service platform being connected to an application server, the network parameter being a value for determining resource information used by the mobile communication apparatus to perform wireless communication, and the network assist information being information used to adjust or optimize the network parameter managed by at least one of an HSS (home subscriber server), an MME (mobility management entity), an S-GW (serving gateway), and a P-GW (packet data network gateway).

* * * * *